Nov. 15, 1960     J. W. JEFFRESS     2,960,351
RAISING AND LOWERING MECHANISM FOR VEHICLE STABILIZING WHEEL
Filed June 20, 1958     2 Sheets-Sheet 1
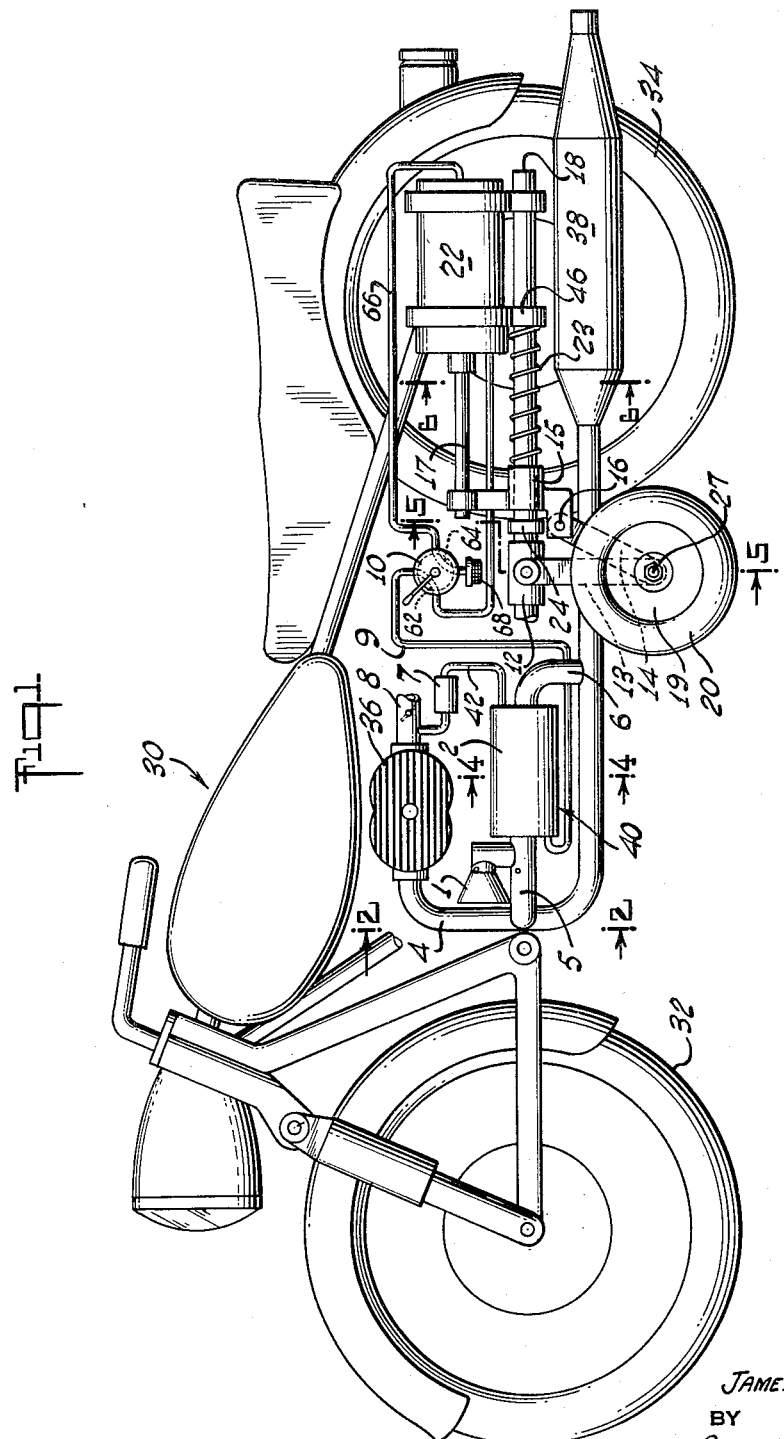
INVENTOR
JAMES W. JEFFRESS
BY
Moses, Nolte & Nolte
ATTORNEYS

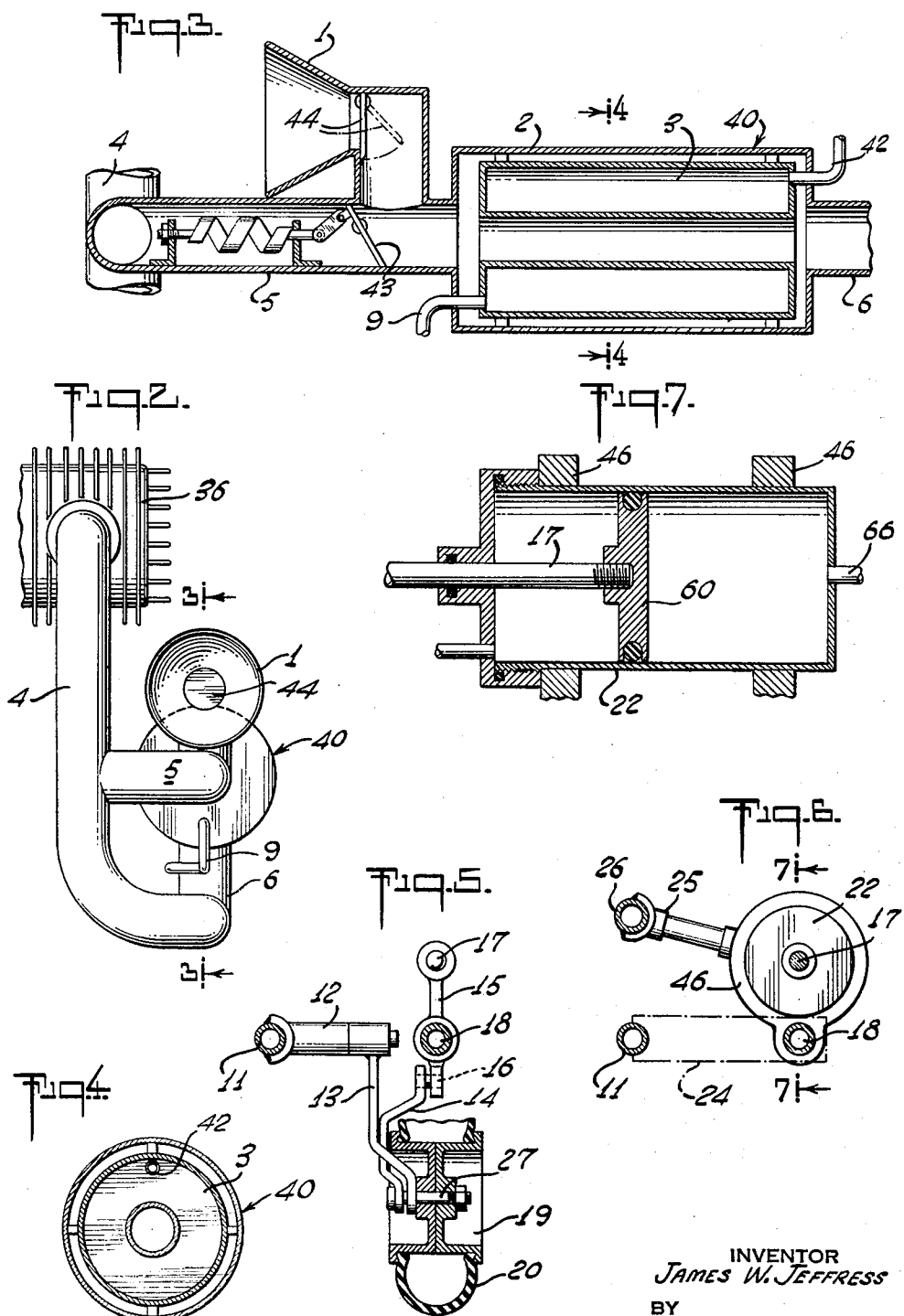

United States Patent Office 2,960,351
Patented Nov. 15, 1960

2,960,351

RAISING AND LOWERING MECHANISM FOR VEHICLE STABILIZING WHEEL

James Willie Jeffress, 27—51 Gilmore St., East Elmhurst 69, N.Y.

Filed June 20, 1958, Ser. No. 743,412

5 Claims. (Cl. 280—293)

This invention relates to a device which has been found to be especially useful for balancing two-wheeled passenger vehicles of the motorcycle type. The device is designed to operate on a minimum amount of power, thereby making it unnecessary to install a special pump or motor on the vehicle to supply power for its operation. The device operates on energy converted from two sources, which are created by the normal function of the vehicle's engine. The sources of energy are the sub-atmospheric pressure in the engine's intake manifold and the hot gases of the exhaust system.

The conversion of the sub-atmospheric pressure in the engine's intake manifold and the hot gases of the exhaust system to a mechanical force is accomplished by the use of a heat exchanger and a double-acting vacuum cylinder fitted with a piston and push rod, having vacuum-tight seals. A conduit which is connected to and extending from the engine's intake manifold connects the heat exchanger and a four-way valve in series with the double-acting vacuum cylinder. By this arrangement, the sub-atmospheric pressure created in the engine's intake manifold may be directed to either side of the double-acting vacuum cylinder piston by manipulation of the four-way valve. This action, in turn, will cause a thrust to act on the vacuum cylinder piston. The thrust, acting on the vacuum piston, is amplified by the reaction of the heat exchanger.

The heat exchanger serves as a vacuum accumulator and amplifies the force acting on the vacuum piston during the cycle of increasing and decreasing temperatures, caused by the acceleration and deceleration of the vehicle's engine. A rise in the heat exchanger's temperature causes an increase in the volume of the air within the vacuum accumulator and forces some of the air from the unit. A decrease in the heat exchanger's temperature causes a reverse action to take place and the volume of air decreases. However, the air that was expelled from the vacuum accumulator during the temperature rise does not return, because of a one-way flow check valve, installed in the conduit between the heat exchanger and the engine's intake manifold. The latter reaction of the heat exchanger causes a pressure drop in the vacuum accumulator greater than that of the sub-atmospheric pressure in the engine's intake manifold. This additional pressure drop, caused by the heat exchanger, increases the thrust acting on the vacuum cylinder's piston. The thrust acting on the vacuum cylinder's piston is transmitted to the push rod, which is attached thereto and becomes a mechanical force.

The utilization of the mechanical force exerted by the push rod serves as a power source for actuating a thrust wheel assembly which contacts the roadway.

One objective of the thrust device is to maintain the balance of the vehicle when it is traveling at low speeds and when parked.

Still another objective of the device is to enable the operator of the vehicle to operate it on either two or three wheels, whenever he wishes to do so.

A more specific objective of the device is to provide a device which is relatively simple in construction and economical in cost, that will make the said type of vehicle safer and easier to operate and reduce the possibility of skidding on slippery roadway. Other objectives and advantages of my invention will be seen from the following description of a preferred embodiment which is illustrated in the accompanying drawings.

In reference to the drawings:

Figure 1 is a side elevation of a two wheeled type vehicle with the device attached thereto.

Figure 2 is a fragmentary front elevation of the air scoop and heat exchanger taken on the line 2—2 of Figure 1.

Figure 3 is a fragmentary section taken on the line 3—3 of Figure 2 showing thrust wheel assembly and thrust arm-pivot with bracket mount.

Figure 4 is a fragmentary section taken on the line 4—4 of Figure 1 and showing the double acting vacuum cylinder and mounting brackets.

Figure 5 is a fragmentary section taken on line 5—5 of Figure 1 showing the auxiliary wheel linkage. Figure 6 is a fragmentary section taken on the line 6—6 of Figure 1. Figure 7 is a sectional view of the vacuum cylinder.

Referring to the drawings in particular the invention as embodied therein includes a motorcycle generally designated 30 having the usual front and back wheels 32 and 34. The back wheel 34 is driven from an internal combustion engine 36 having an air inlet 8 and an exhaust manifold 4 which discharges into an exhaust muffler 38 to the atmosphere.

In accordance with the invention in order to utilize the heat of the exhaust gases passing through the exhaust manifold 4, a heat accumulator generally designated 40 is provided. The heat accumulator 40 includes an inner annular hollow member or accumulator chamber 3 and an outer shell 2 spaced therefrom. Exhaust gases are by-passed from the exhaust manifold 4 through a conduit 5 and into the outer shell 2 and out therefrom through a discharge conduit 6 back into the exhaust manifold 4. A connection conduit 42 connects the interior chamber 3 with the inlet 8 of the engine 36. A one-way vacuum check valve 7 is provided to permit flow only from the chamber 3 into the inlet 8 and not vice-versa. The interior of the heat accumulator chamber 3 also communicates through a passage 9 to a four-way valve 10.

When the engine 36 is started exhaust gases normally flow through the conduit 5 and the shell 2 in heat exchange relationship with the interior heat accumulator chamber 3 to cause expansion of any gas trapped therein. A thermostatically controlled valve 43 is positioned in the conduit 5 and shuts this conduit off automatically when the temperature of the exhaust gases exceeds a certain amount. The high temperature exhaust gases in heat exchange relationship with the heat accumulator chamber 3 causes expansion of any air or gas trapped therein and flow through the conduit 42, check valve 7 and inlet 8. When the valve 43 closes automatically the temperature in the accumulator shell 2 drops off and effects a reduction of pressure within the inner heat accumulator chamber 3 as the latter is cooled. Since no air can flow back through the check valve 7 this negative pressure is useful in the operation of a device to be explained more fully hereinafter. When the engine 36 is idling the inlet pressure is substantially below atmospheric and this reduced pressure effects evacuation and reduction of pressure of the accumulator chamber 3 via the passage 42 and check valve 7. Thus the accumulator 3 is always maintained at or below the inlet pressure of the engine 36.

In order to rapidly cool the heat accumulator cylinder 3 an air scoop 1 is provided which faces in the direction of forward travel of the vehicle and traps cold air as the vehicle moves and delivers it through the outer shell 2 in an amount proportional to the amount of forward velocity of the vehicle. A gravity actuated valve 44 located in the interior of the air scoop 1 closes automatically when the velocity of the incoming air is reduced below a predetermined amount. Thus, when the vehicle is at rest there is very little cooling air available.

In accordance with the invention the negative pressure produced within the interior of the accumulator cylinder 3 is advantageously used to position a wheel 19 having a tire 20 in a downward vehicle stabilizing position automatically whenever the vehicle begins to slow down. The wheel 19 is rotatably supported on a thrust wheel axle 27 which is pivotally mounted on a thrust arm 13. The thrust arm 13 is pivotally mounted on a thrust arm trunnion bracket 12 which is connected to a portion of the vehicle frame at 11. The wheel 19 is moved between a downward vehicle stabilizing position to an upward retracted position by a retracting link 14 which is pivotally connected to a sliding bushing trunnion pin 16 on a sliding bushing 15 which is slidably mounted on a bushing guide bar 18. The guide bar 18 is supported by a laterally extending bracket 24. A coil spring 23 is provided on the guide bar 18 and held between a stationary bracket 46 and the sliding bushing 15 and urges the bushing 15 in a forward direction to effect movement of the wheel 19 to a downward vehicle stabilizing position.

The sliding bushing 15 is provided with an upstanding portion which is connected to a vacuum cylinder push rod 17 which is provided with a double-headed piston 60 within the interior of a vacuum cylinder 22. The vacuum cylinder 22 is supported by an arm 25 on an upper frame member 26 of the vehicle.

The four-way valve 10 may be suitably manually or remote control operated to communicate either the rear end of the vacuum cylinder 22 or the forward end of the vacuum cylinder 22 with the interior of the vacuum accumulator chamber 3.

The four-way valve is set to operate to effect the downward positioning of the wheel 19 when the vehicle slows down. This is accomplished by insuring that the pressure on the forward end of the vacuum cylinder 22 is lower than on the rear end in order to permit the spring 23 to urge the retracting link 14 to a position at which the arm 13 is vertical. The four-way valve 10 includes internal passage means 62 and 64 which may be shifted between alignment with the conduit 9 or a conduit 66 connected to the rear end of the cylinder 22. Thus in the accumulator 3 vacuum pressure may be connected as indicated in Fig. 1 to the conduit 9 and the forward end of cylinder 22 or the conduit 66 connected to the after-end of the cylinder 22. In the first case, the passage 64 connects the conduit 66 with a vent 68 to vent this portion to atmosphere and, in the second case, the internal conduit 64 connects the forward end of the cylinder 22 to vent this portion to atmosphere through the vent 68.

Since a great forward velocity of the vehicle causes an increase in the cooling air passing through the scoop 1, a high degree of vacuum is produced in the accumulator 3. In this instance the accumulator is connected to the rear end of the cylinder to reduce the pressure on this side and move slide bushing 15 to the rear and cause retraction of the wheel 19. When the forward velocity is reduced the vacuum in the accumulator is increased because the flow of air from the atmosphere into the intake 8 is stopped by the closing of the engine throttle, and the pumping action of the engine's piston continues to reduce the pressure in the intake 8 and the accumulator 3. As the vehicle slows means are provided to switch the four-way valve 10 so that the vacuum pressure is applied to the front of the piston connected to the push rod 17 to effect lowering of the wheels to a vehicle stabilizing position. In the downward position of wheel 19 the vacuum in the accumulator cylinder 3 may be communicating with the forward end of the cylinder 22 by maintaining this position of the four-way valve 10, in order to maintain the wheel in its downward position both under the influence of the vacuum and the spring 23.

The accumulator 40 operates to produce a vacuum in three stages, namely: (1) the initial pressure reduction stage; (2) the expansion and expulsion of gas stage; and (3) the cooling and contraction of gas stage. Each of the aforementioned conditions takes place in effecting the production of a vacuum within the heat accumulator 3. The first change to take place within the accumulator is the establishment of an equilibrium of the pressure therein to that of the intake manifold. This is instantaneously effected when the vehicle's engine is started and operated at idling speeds. The volume of pressure of the exhaust gas at idling speeds is very small and causes no major change in the temperature of the heat exchanger 40 since the major portion of the exhaust gas can easily flow through the exhaust pipe 4.

When the engine is speeded up above idling speed and during the warm up period of the engine, the second stage takes place in the accumulator 3. This also occurs when the engine is driving the vehicle to increase its velocity to a normal cruising speed. The volume and pressure of the exhaust gas at this time is greatly increased and a large volume of the exhaust gases are forced through the inlet pipe 5 and the heat exchanger 40 to cause expansion and expulsion of additional gas from the heat accumulator unit 3. The expansion and expulsion period normally ends before or during acceleration of the vehicle up to a normal driving speed or until the thermostatically controlled valve 43 closes the inlet 5.

The third stage of the cycle takes place within the heat exchanger and vacuum accumulator 3 by the cooling and contraction of the gas which is trapped within the unit. This cooling and contraction of the gas normally starts and continues while the vehicle is traveling at cruising speed since the valve 44 located in the air scoop 1 is opened by the impact of the incoming air as the vehicle is moved. The amount of impact pressure required to overcome the force of gravity which holds the valve 44 in a closed position is set to be obtained at the normal driving speed of the vehicle. Therefore, the cooling and contracting of the gas depends upon the speed of the vehicle or the point at which the valve opens to permit an inflow of cooling air to cause contraction of the gas within the accumulator and a further production of vacuum therein. The complete cycle referred to takes place only once, between the time the vehicle is accelerated from a zero velocity to a normal driving speed. The total volume of the reduced pressure caused by the engine's intake manifold and the contraction of the gas which is stored in the accumulator after one cycle of change has been completed is sufficient to operate the wheel raising and lowering mechanism several times. Therefore, it is not necessary for the complete cycle of changes to occur prior to each time the mechanism is to be operated for lowering or raising the wheel 19.

I claim:

1. In a vehicle having a propulsion engine with high temperature exhaust gases, the improvement comprising a vacuum producing device connected to the exhaust manifold of said engine including wall means defining an inner vacuum accumulator chamber, wall means defining an outer exhaust gas heat exchanger shell surrounding said accumulator chamber, conduit means periodically connecting said outer shell with the exhaust gas manifold of said engine, temperature responsive valve means in said conduit means for periodically disconnecting said manifold and said outer shell, one way flow conduit means connecting said accumulator chamber to the engine inlet for flow from said accumulator chamber to said engine inlet, and means to periodically direct cooling air into said outer shell to cool said inner heat accumulator chamber and reduce the pressure therein.

2. In a vehicle having at least two wheels for movement over the ground and having a prime mover generating high temperature exhaust gases and having an inlet at sub-atmospheric pressure, a vacuum accumulator including an accumulator container, an outer container surrounding said accumulator container, means for periodically directing exhaust gases from said engine to said outer container, conduit means for periodically conducting atmospheric cooling air into said outer container, and one-way flow conduit means connecting said accumulator chamber with the inlet of said engine for flow from said accumulator to said inlet whereby the pressure in said accumulator is reduced to the pressure of said inlet.

3. In a vehicle according to claim 2 including a pivotally mounted laterally extending stabilizing wheel movable between a position having an outer periphery in horizontal alignment with the outer peripheral surface of the other wheels of said vehicle to a position with the outer periheral surface substantially above the outer peripheral surface of said other wheels, piston and cylinder means connected to said wheel to move said wheeel between said aforementioned positions, and means to communicate the interior of said vacuum accumulator container with one end of said piston and cylinder means in order to actuate the latter.

4. A motorcycle comprising at least two wheels, an internal combustion engine driving motor connected to at least one of said wheels for propelling said vehicle, an exhaust manifold for said motor, an inlet for said motor, an accumulator container mounted on said vehicle, an outer shell extending around said accumulator container, means connecting said exhaust gas manifold with said outer shell, conduit means connecting atmospheric air with said outer shell, one-way conduit means connecting said accumulator with said engine inlet, means for automatically disconnecting said conduit means for exhaust gases to said outer shell, means for automatically disconnecting the connection between said atmospheric air and said outer shell, a stabilizing wheel, a thrust arm pivotally mounted on said vehicle frame and pivotally connected at its opposite end to said stabilizing wheel, a retracting link pivotally connected to said balancing wheel, a vacuum cylinder, a double-acting piston in said vacuum cylinder reciprocatably movable therein, said piston being connected to said retracting link, means to bias said retracting link in a forward position with said stabilizing wheel in a downward vehicle stabilizing position, and means to communicate one end of said cylinder with said accumulator tank to effect retraction of said balancing wheel.

5. A vehicle according to claim 4, wherein said last-named means includes a four-way valve having one passage connected to the interior of said heat accumulator chamber, a second passage connected to one end of said vacuum cylinder, and a third passage connected to the other end of said vacuum cylinder.

References Cited in the file of this patent

UNITED STATES PATENTS

| | | |
|---|---|---|
| 2,143,183 | Barr | Jan. 10, 1939 |
| 2,300,762 | Andrews | Nov. 3, 1942 |
| 2,589,023 | Pattner | Mar. 11, 1952 |

FOREIGN PATENTS

| | | |
|---|---|---|
| 390,056 | Germany | Feb. 16, 1924 |